US011308533B2

(12) United States Patent
Tomita et al.

(10) Patent No.: US 11,308,533 B2
(45) Date of Patent: Apr. 19, 2022

(54) SUPPLIER EVALUATION SYSTEM AND SUPPLIER EVALUATION METHOD

(71) Applicant: HITACHI, LTD., Tokyo (JP)

(72) Inventors: Minatsu Tomita, Tokyo (JP); Hidenori Kiuchi, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 16/977,788

(22) PCT Filed: Jan. 8, 2019

(86) PCT No.: PCT/JP2019/000177
§ 371 (c)(1),
(2) Date: Sep. 2, 2020

(87) PCT Pub. No.: WO2019/234958
PCT Pub. Date: Dec. 12, 2019

(65) Prior Publication Data
US 2020/0402124 A1    Dec. 24, 2020

(30) Foreign Application Priority Data

Jun. 5, 2018   (JP) ............................. JP2018-107521

(51) Int. Cl.
*G06Q 30/00* (2012.01)
*G06Q 30/06* (2012.01)
*G06Q 30/02* (2012.01)

(52) U.S. Cl.
CPC ....... *G06Q 30/0609* (2013.01); *G06Q 30/018* (2013.01); *G06Q 30/0201* (2013.01)

(58) Field of Classification Search
None
See application file for complete search history.

(56) References Cited

U.S. PATENT DOCUMENTS

2013/0198196 A1* 8/2013 Myslinski ............. G06Q 30/02
707/740
2017/0236063 A1* 8/2017 Dorris ................... G16H 20/60
706/11

FOREIGN PATENT DOCUMENTS

JP    2002-007647 A    1/2002
JP    2003-303252 A    10/2003
(Continued)

OTHER PUBLICATIONS

International Search Report of PCT/JP2019/000177 dated Mar. 12, 2019.

*Primary Examiner* — Mila Airapetian
(74) *Attorney, Agent, or Firm* — Mattingly & Malur, PC (57) ABSTRACT

An object of the present invention is to provide a reliable supplier evaluation system for correctly evaluating suppliers. A supplier evaluation system 117 according to the present invention is a system for evaluating suppliers based on information relating to a transaction conducted between a buyer and the supplier. The supplier evaluation system 117 is provided with a reception function for receiving communication information 134 and e-commerce information conducted between a buyer and a supplier and that exists in a company system such as that of a buyer, a conversion function for converting the communication information and the e-commerce information into a predetermined format, a database 133 for storing keyword information, and an analysis function 127 for comparing keyword information 138 registered in advance in a storage device with the converted communication information and e-commerce information, and determining a cause of a transaction result of the e-commerce information.

8 Claims, 9 Drawing Sheets

(56) References Cited

FOREIGN PATENT DOCUMENTS

| | | |
|---|---|---|
| JP | 2005-190388 A | 7/2005 |
| JP | 2010-257066 A | 11/2010 |
| JP | 2016-038658 A | 3/2016 |

* cited by examiner

SUPPLIER INFORMATION — 137

| SUPPLIER CODE (301) | SUPPLIER NAME (302) | PHONE NUMBER (303) | EMAIL ADDRESS (304) |
|---|---|---|---|
| 12345 | ○△× CORPORATION | 12-3456-7890 | ○△×@.com |

FIG. 4

BUYER INFORMATION — 136

| BUYER CODE (401) | BUYER NAME (402) | INDUSTRY TYPE (403) | PHONE NUMBER (404) | EMAIL ADDRESS (405) |
|---|---|---|---|---|
| 67890 | ABC CORPORATION | AUTOMOBILES | 09-8765-4321 | ABC@.com |

FIG. 5

COMMERCE INFORMATION — 135

| PO# (501) | BUYER CODE (502) | BUYER NAME (503) | SUPPLIER CODE (504) | SUPPLIER NAME (505) | COMPONENT CODE (506) | COMPONENT NAME (507) | DEADLINE (508) | ARRIVAL DATE (509) | TEST (510) | ALERT (511) |
|---|---|---|---|---|---|---|---|---|---|---|
| AAA1 | 67890 | ABC CORPORATION | 12345 | ○△× CORPORATION | SCREW-1 | SCREW | 2018 0222 | 2018 0223 | PASS | DEADLINE DELAY |
| AAA2 | 67890 | ABC CORPORATION | 12345 | ○△× CORPORATION | SPRING-1 | SPRING | 2018 0223 | 2018 0223 | PASS | |

FIG. 6

SUPPLIER EVALUATION INFORMATION — 139

| SUPPLIER CODE (601) | SUPPLIER NAME (602) | INDUSTRY TYPE 01 (603) | TRANSACTION COUNT 01 (604) | INDUSTRY TYPE 02 (605) | TRANSACTION COUNT 02 (606) | ANALYSIS COUNT (607) | NON-SUPPLIER CAUSE (608) | DEADLINE DELAY (609) | FAIL (610) | EVALUATION (611) |
|---|---|---|---|---|---|---|---|---|---|---|
| 12345 | ○△× CORPORATION | AUTOMOBILES | 9 | HOME APPLIANCES | 1 | 1 | 1 | 1 | 0 | 90 |

FIG. 7

KEYWORD INFORMATION — 138

| ALERT (701) | KEY 1 (702) | KEY 2 (703) | KEY 3 (704) | KEY 4 (705) |
|---|---|---|---|---|
| DEADLINE DELAY | LATE | DELAY | PUSH-BACK | SUPPLY DELAY |
| FAIL | FAIL | POOR | DEFECT | OUT OF STOCK |

FIG. 8

COMMUNICATION INFORMATION — 134

| SUPPLIER COMMUNICATION CODE (801) | BUYER COMMUNICATION CODE (802) | MEDIUM (803) | DATE (804) | CONTENT (805) |
|---|---|---|---|---|
| ○△×@.com | ABC@.com | EMAIL | 2/1 | WE APPRECIATE YOUR ... |
| 12-3456-7890 | 09-8765-4321 | TELE-PHONE | 2/4 | HELLO, WE APPRECIATE ... |

FIG. 9

SUPPLIER EVALUATION HISTORY INFORMATION — 140

| SUPPLIER CODE (901) | SUPPLIER NAME (902) | INDUSTRY TYPE 01 (903) | TRANSACTION COUNT 01 (904) | INDUSTRY TYPE 02 (905) | TRANSACTION COUNT 02 (906) | ANALYSIS COUNT (907) | NON-SUPPLIER CAUSE (908) | DEADLINE DELAY (909) | FAIL (910) | EVALUATION (911) |
|---|---|---|---|---|---|---|---|---|---|---|
| 12345 | ○△× CORPORATION | AUTOMOBILES | 9 | HOME APPLIANCES | 1 | 0 | 0 | 1 | 0 | 90 |

■ CAUSE ANALYSIS RESULT SCORE DETAILS SCREEN    [REVISE] [REVISE HISTORY]
○△× CORPORATION

| | ANALYSIS EXECUTION DATE | CAUSE ANALYSIS SCORE | ANALYSIS MEDIUM | COMMUNICATION DATE | REVISION REASON |
|---|---|---|---|---|---|
| ✓ | 2018.1.18 | 10 | TELEPHONE | 2018.1.11 | ▼ |

FIG. 16

■ SUPPLIER EVALUATION RESULT HISTORY
○△× CORPORATION

| UPDATE DATE | TRANSACTION COUNT | OVERALL EVALUATION | CAUSE ANALYSIS SCORE |
|---|---|---|---|
| 2018.1.18 | 10 | 90 | 10 |
| 2017.12.31 | 10 | 90 | 0 |
| 2017.12.24 | 9 | 100 | 0 |
| 2017.12.2 | 8 | 100 | 0 |

SUPPLIER EVALUATION SYSTEM AND SUPPLIER EVALUATION METHOD

TECHNICAL FIELD

The present invention relates to a supplier evaluation system and a supplier evaluation method.

BACKGROUND OF THE INVENTION

In recent years, in inter-enterprise procurement operations (S2C(Sourcing to Contract)), and particularly inter-enterprise procurement operations (S2C(Sourcing to Contract)) and global S2C operations, bringing in new suppliers after highly accurate evaluations has become an important factor for improving procurement quality and the competitiveness required for price reductions. For this reason, it is essential for many companies that operate globally to introduce strategic sourcing software (Strategic Sourcing Application Suite) to strategically evaluate and manage suppliers.

For example, Patent Document 1 illustrates a quality level evaluation program for quantitatively evaluating a quality level of a supplier based on a plurality of condition information of a supplier manufacturing process. In addition, in Patent Document 2, a function of proposing an optimal supplier based on such an evaluation result is illustrated; accordingly, there is an increasing need to utilize the evaluation results of suppliers.

CITATION LIST

Patent Literature

[Patent Document 1] Japanese Unexamined Patent Application Publication No. 2003-303252
[Patent Document 2] Japanese Unexamined Patent Application Publication No. 2002-007647

SUMMARY OF INVENTION

Technical Problem

In S2C operations, bringing in new suppliers after highly accurate evaluations has become an important factor for improving procurement quality and the competitiveness required for price reductions. However, conventional supplier evaluation functions are functions for inputting, analyzing, and evaluating evaluation results on the buyer side, and depend on the input values of the buyer; accordingly, there are problems in which buyers do not input evaluation results, or suppliers are not correctly evaluated when the evaluation results are input based on the subjectivity of the buyer.

In addition, in Patent Document 1, the quality level of a supplier is quantitatively evaluated based on a plurality of condition information for a supplier manufacturing process, but as only the electronic data provided in an e-commerce marketplace is evaluated, the cause of the evaluation context (buyer reason/supplier reason) is not taken into account in the evaluation. For example, even in cases where a deadline falls behind due to the buyer, issues in which the cause of the deadline delay is attributed to the supplier arise. Accordingly, there is a possibility that even high quality suppliers may fail to be selected.

In Patent Document 2 as well, only past transaction record data is analyzed in selecting the optimum supplier from the products desired to be purchased, and the cause of the analysis result is not analyzed, such that the problem of high quality suppliers failing to be selected remains unchanged.

The present invention provides a reliable supplier evaluation system and method for correctly evaluating suppliers. Accordingly, instead of a supplier evaluation based on buyer subjectivity, it is desirable to implement evaluation based on a quantitatively unified evaluation axis of transactions conducted with a plurality of buyers. In addition, it is also desirable to provide and share highly accurate and reliable evaluation results by conducting an analysis of the cause of the evaluation.

Means for Solving the Problem

In order to solve the above-mentioned problems, there is provided a supplier evaluation system for evaluating a supplier based on information about transactions between a buyer and a supplier, the system including a reception device configured to receive communication information and e-commerce information carried out between a buyer and a supplier and that exists in a system used by one or both of the buyer and the supplier; a conversion device configured to convert the communication information and the e-commerce information into a predetermined format, a storage device configured to store keyword information; and an analysis device configured to compare keyword information registered in advance in the storage device with the converted communication information and e-commerce information, and determine a cause of a transaction result of the e-commerce information.

Advantageous Effects of Invention

According to the present invention, by means of correctly evaluating the supplier, the evaluation time resulting from buyer input is reduced, and the number of work hours required for evaluation by the buyer is reduced.

DESCRIPTION OF EMBODIMENT(S)

Hereinafter, embodiments of the present invention will be described in detail with reference to the drawings.

Figure 1:
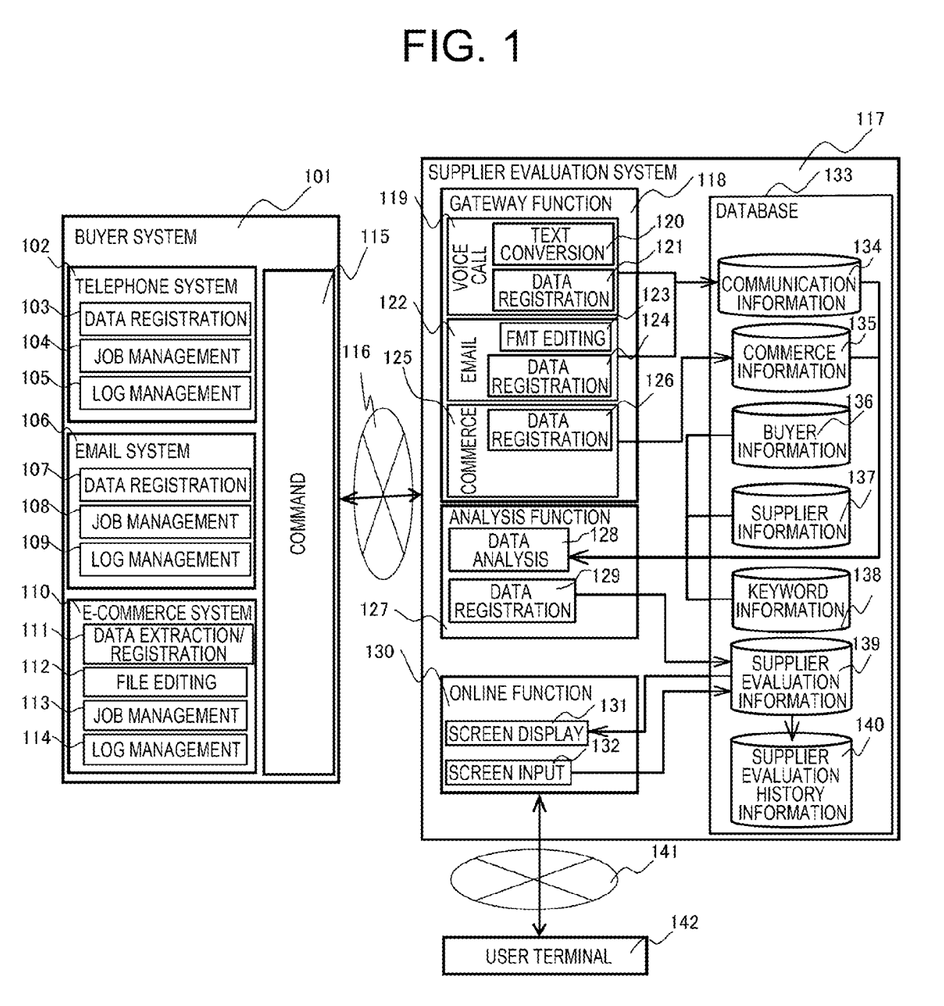
FIG. 1 is an overall conceptual diagram of a supplier evaluation system according to an embodiment of the present invention.

FIG. 1 is a diagram illustrating an overall configuration example including a supplier evaluation system 117 according to the present embodiment. The supplier evaluation system 117 is connected to a plurality of buyer systems 101 of a plurality of buyers and user terminals 142 of a plurality of buyers and a plurality of suppliers, and data is transmitted and received between each computer via a network 116 and a network 141.

The buyer system 101 includes a telephone system 102 and an email system 106 for transmitting/receiving telephone calls and email transmission/reception contents that serve as source information at the time of analyzing the supplier evaluation cause, and an e-commerce system 110 for transmitting/receiving commerce information (order record, deadline, arrival record) of procured products, and transmits/receives the source information to and from the supplier evaluation system 117 via the command 115. The transmission and reception timing of the command 115 is performed in a timely manner at the generation timing of the source information, and the registration (103, 107) of the raw data, the execution JOB management (104, 108) of the command 115, and the log management (105, 109) are performed in the telephone system 102 and the email system 106. In addition, in the electronic commerce system 110, in addition to the execution JOB management 113 and the log management 114 of the command 115, extraction/registration 111 of target information and file editing 112 are executed.

The supplier evaluation system 117 is a system that evaluates suppliers based on information about transactions conducted between buyers and suppliers. The supplier evaluation system 117 includes a gateway function 118, an analysis function 127, an online function 130, and a database 133. The gateway function 118 includes a text conversion 120 that receives the information of voice calls 119, emails 122, and commerce 125 received from the buyer system 101 and converts the voice information into text (textual information), and a format editing 123 that edits the format into a data type for analysis. The gateway function 118 has functions (121, 124) for registering the converted and edited data as communication information 134 in the database 133, and a function 126 for registering the commerce information as the commerce information 135. By using information from email or telephone, which are not required to be newly introduced in an ordinary company, it is possible to obtain appropriate an supplier evaluation without increasing cost.

The analysis function 127 includes pre-registered buyer information 136, supplier information 137, keyword information 138, communication information 134 registered by the gateway function 118, and data analysis 128 for extracting and analyzing data necessary for analysis from the commerce information 135. The analysis function 127 has a data registration 129 for registering the analysis result as supplier evaluation information 139. The data registration 129 stores existing data in the supplier evaluation history information 140 in the case that data having the same key information is already stored.

The online function 130 has a screen display 131 which extracts an analysis result from the supplier evaluation information 139 and displays the extracted analysis result. The online function 130 has a screen input 132 for receiving an instruction to revise the analysis result on the screen displayed by the online function 130 via the user terminal 142, and registers a revision result to the supplier evaluation information 139 when such an instruction is received.

Although not illustrated in the figures, the user terminal 142 can be implemented by a general computer and includes a control unit such as a CPU, a storage unit, an input unit, a display unit, a network interface unit, and the like. It should be noted that, depending on the computer, configurations not provided with an input unit and a display unit are also possible.

Figure 2:
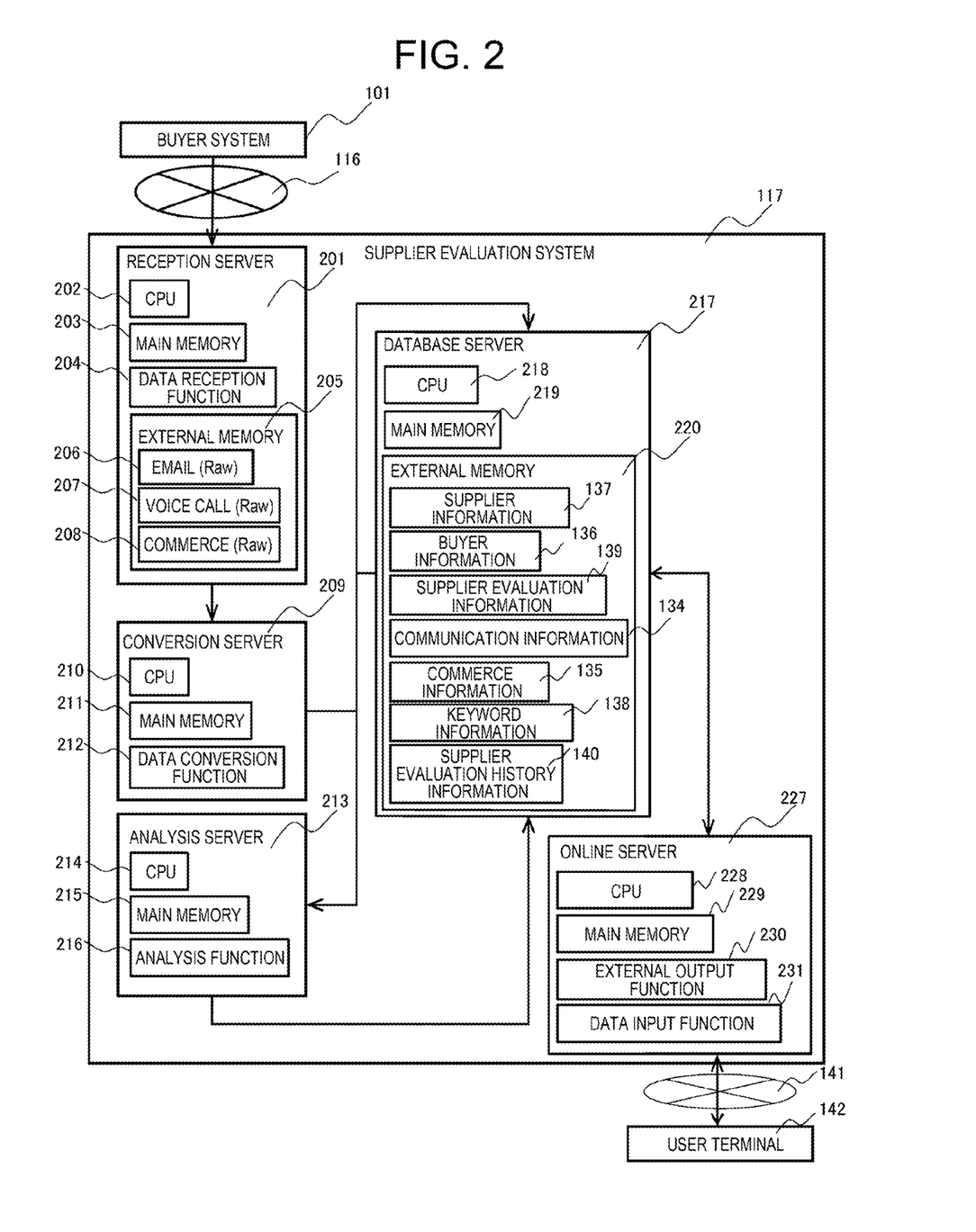
FIG. 2 is a system configuration diagram of a supplier evaluation system according to an embodiment of the present invention.

FIG. 2 is a system configuration diagram of the supplier evaluation system 117. The supplier evaluation system 117 includes a reception server 201 (reception device) having a portion of the functions of the gateway function 118, a conversion server 209 (conversion device) having a portion of the functions of the gateway function 118, an analysis server 213 (analysis device) having an analysis function server 127, a database server 217 (storage device) having a database 133, and an online server 227 (output device) having an online function 130.

The reception server 201 receives communication information, such as telephone calls and e-mails, and e-commerce information carried out between the buyer and the supplier and that is held in the buyer system 101, which is an enterprise system used by the buyer. In order to receive the analysis source data received from the buyer system 101, the reception server 201 is configured by a CPU 202, a main memory 203, a data reception function 204, and an external memory 205 that stores the unprocessed emails (raw) 206, the voice calls (raw) 207, and the commerce (raw) 208 information, which serve as the analysis source data, and receives the data and passes the data to the conversion server 209. Although the reception server 201 is connected only to the buyer system 101 in the present embodiment, it may be connected to an enterprise system used by the supplier and receive similar data from this system.

The conversion server 209 converts the communication information and the ecommerce information received from the buyer system 101 by the reception server 201 into a predetermined format. The conversion server 209 includes a CPU 210, a main memory 211, and a data conversion function 212 that converts the raw data stored in the reception server 201 prior to processing into a form capable of supplier evaluation and evaluation cause processing.

The database server 217 includes a CPU 218, a main memory 219, and an external memory 220 that holds the supplier information 137, the buyer information 136, the supplier evaluation information 139, the communication information 134, the commerce information 135, the keyword information 138, and the supplier evaluation history information 140, and stores the converted data in the conversion server 209.

The analysis server 213 compares the keyword information 138 registered in advance in the external memory 220 of the database server 217 with the communication information and the e-commerce information converted by the conversion server 209, and determines the cause of the transaction result of the e-commerce information. The analysis server 213 includes a CPU 214, a main memory 215, and an analysis function 216 for analyzing a transaction result of the ecommerce information.

The online server 227 electronically transmits or visually displays the results determined by the analysis server 213 to other systems. In the present embodiment, the online server 227 will be described as an example for visual displaying on a screen. The online server 227 includes a CPU 228 and a main memory 229, an external output function 230, and a data input function 231. The external output function 230 combines the information stored in the database server 217 to create a list screen, a details screen, and a history screen as a supplier evaluation result, and display these on the user terminal 142. The data input function 231 reflects the information input from the user terminal 142 (the cause analysis result revision information associated with a revision instruction or the like) in the information stored in the database server 217.

Figure 3:
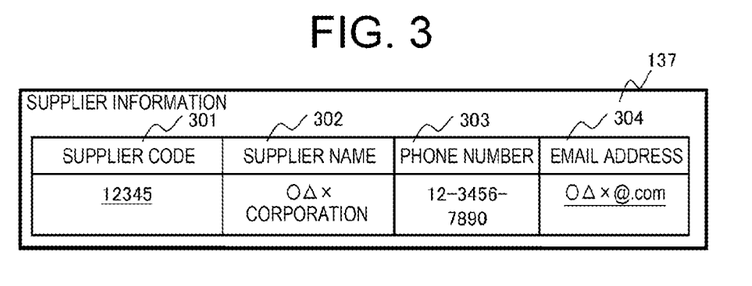
FIG. 3 is a diagram illustrating a data configuration example of supplier information in which supplier basic information is stored according to an embodiment of the present invention.

FIG. 3 is a diagram illustrating a data configuration example of the supplier information 137 in which the supplier basic information held by the database 133 of the supplier evaluation system 117 is stored. The supplier information 137 stores a supplier code 301, a supplier name 302, a phone number 303, an email address 304, and the like.

Figure 4:
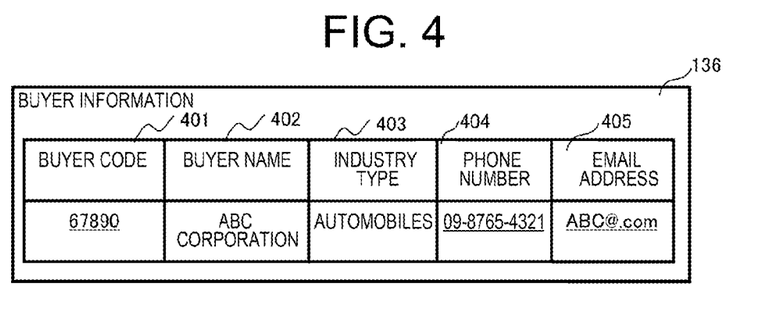
FIG. 4 is a diagram illustrating a data configuration example of buyer information in which buyer basic information is stored according to an embodiment of the present invention.

FIG. 4 is a diagram illustrating a data configuration example of the buyer information 136 in which the buyer basic information held by the database 133 of the supplier evaluation system 117 is stored. The buyer information 136 stores a buyer code 401, a buyer name 402, an industry type 403, a phone number 404, an email address 405, and the like.

Figure 5:
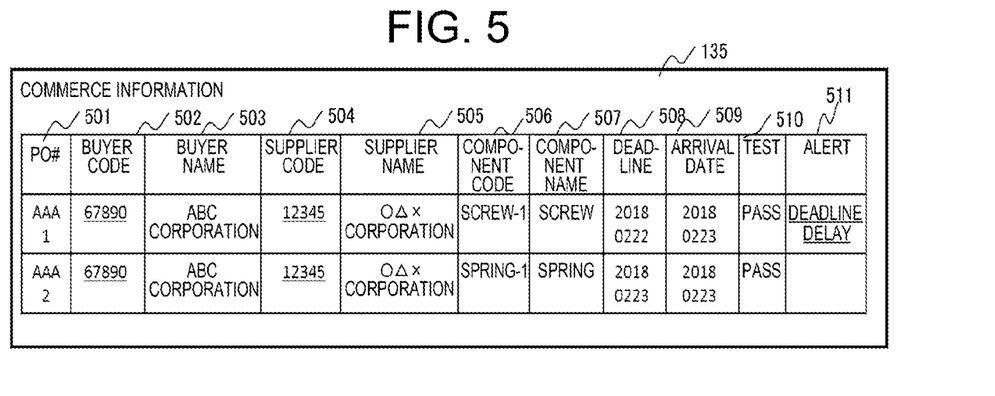
FIG. 5 is a diagram illustrating a data configuration example of commerce information in which commerce information (order, deadline, delivery result, inspection result) in the procurement process is stored according to an embodiment of the present invention.

FIG. 5 is a diagram illustrating a data configuration example of the commerce information 135 in which the commerce information in the procurement process of the database 133 of the supplier evaluation system 117 is stored. The commerce information 135 stores a PO #501, a buyer code 502, a buyer name 503, a supplier code 504, a supplier name 505, a component code 506, a component name 507, a deadline 508, an arrival date 509, a test 510, an alert 511, and the like.

Figure 6:
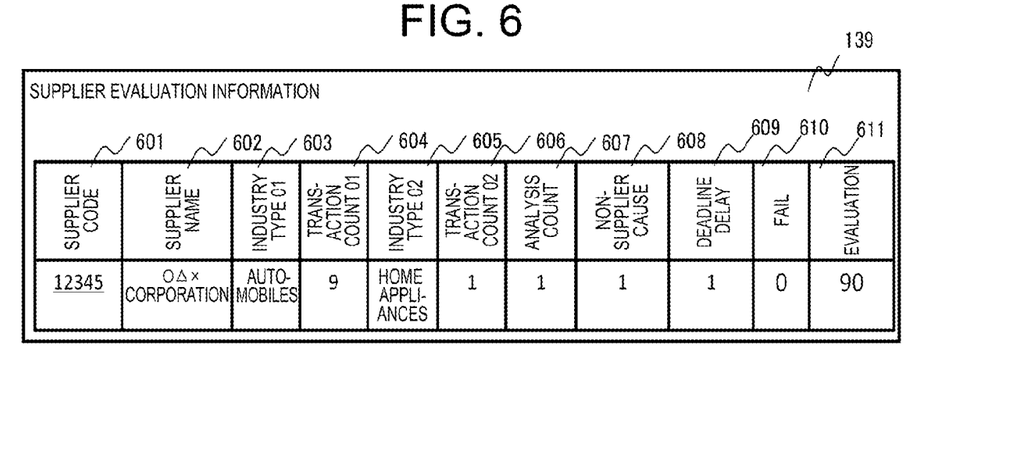
FIG. 6 is a diagram illustrating a data configuration example of supplier evaluation information in which the supplier evaluation results are stored according to an embodiment of the present invention.

FIG. 6 is a diagram illustrating a data configuration example of the supplier evaluation information 139 in which the supplier evaluation results are stored. The supplier evaluation information 139 includes the following three elements: a supplier basic information related item created from the supplier information 137, a commerce related item created from the commerce information 135, and an evaluation/analysis related item in which information regarding the results of the supplier evaluation and the results of the cause analysis are stored. The supplier basic information related item includes the supplier name 602 and the like, and supplier name 602 is acquired by searching the supplier information 137 included in the database 133 using the supplier code 301 of the supplier evaluation information 139 as a key.

In addition, the commerce related item includes an industry type 01 603 maintained as a repetitive number (the upper limit of the repetitive number is not limited) and a transaction count 01 604 associated therewith, an industry type 02 605 and the transaction count 02 606 associated therewith, and a deadline delay 609 and fail 610 as alert information. The industry type 01 603 and the transaction count 01 604 associated therewith, and the industry type 02 605 and the transaction count 02 606 associated therewith are created by a procedure of retrieving the commerce information 135 using the supplier code 601 as a key, retrieving the buyer information 136 using the corresponding plurality of buyer codes 502 as keys, storing the industry type 403 associated with the retrieved buyer code 401 in the industry type 01 603 of the supplier evaluation information 139, and storing it in the industry type 02 605 when a plurality of industry types are retrieved. In addition, when the industry type 403 corresponding to the buyer code 401 included in the buyer information 136 is retrieved from the buyer code 502 included in the commerce information 135, in the case that the same industry type is searched a plurality of times, the number of times each industry type is retrieved is counted up and stored in the transaction count 01 604 included in the supplier evaluation information 139. In the case that a plurality of industry types are retrieved, they are stored in and after the transaction count 01 606.

The deadline delay 609 stores a numerical value obtained by retrieving the commerce information 135 using the supplier code 601 as a key, and counting the records in which the alert 511 included in the commerce information 135 is a deadline delay. In addition, the fail 610 stores a numerical value obtained by searching the commerce information 135 using the supplier code 601 as a key, and counting the records in which the test 510 included in the commerce information 135 fails.

Among the evaluation/analysis related items, the evaluation 611 is based on the commerce information 135 and the supplier information 137 included in the database 133, and includes a result of a quantitative evaluation of the quality level. It should be noted that, as for the quantitative evaluation method and process for creating the evaluation 611, the evaluation procedure and method are not limited as long as they have functionality for implementing supplier evaluation that does not depend only on buyer input as in the evaluation methods illustrated in Patent Document 1 and Patent Document 2, as examples. Among the evaluation/ analysis-related items, the analysis count 607 analyzes whether the result illustrated in the evaluation 611 is caused by a supplier or by a cause other than the supplier, and includes the number of times that this result is represented in the supplier evaluation information 139. The non-supplier cause 608 illustrates the number of analyses determined to be delayed due to reasons other than a cause of the supplier as a result of analyzing whether the result illustrated in the evaluation 611 is due to a supplier cause or a cause other than the supplier.

Figure 7:
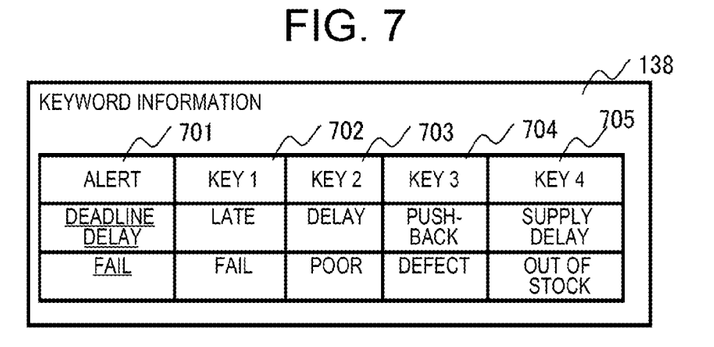
FIG. 7 is a diagram illustrating a data configuration example of keyword information in which search keywords for searching communication information corresponding to alerts that occurred during the procurement process during supplier evaluation cause analysis are stored according to an embodiment of the present invention.

FIG. 7 is a diagram illustrating a data configuration example of keyword information 138 included in the database 133 of the supplier evaluation system 117. The keyword information 138 stores search keywords for retrieving the communication information 134 associated with an alert generated during the procurement process at the time of the supplier evaluation cause analysis. The keyword information 138 includes a key 1702—(the upper limit of the number of repetitions is not limited) that serves as a keyword for the alert 701, and the keys 1702—are predefined by the buyer prior to the start of use of the supplier evaluation system 117. It should be noted that, although not illustrated in the figures, the consistency of the key data included based on the revision result may be periodically revised and corrected by accumulating the revision data when revision instructions for the cause analysis result are received from the user terminal 142 and introducing a machine learning function. The machine learning function may be any product, procedure, or method as long as it has a function of accumulating data, learning, and reflecting the results thereof.

Figure 8:
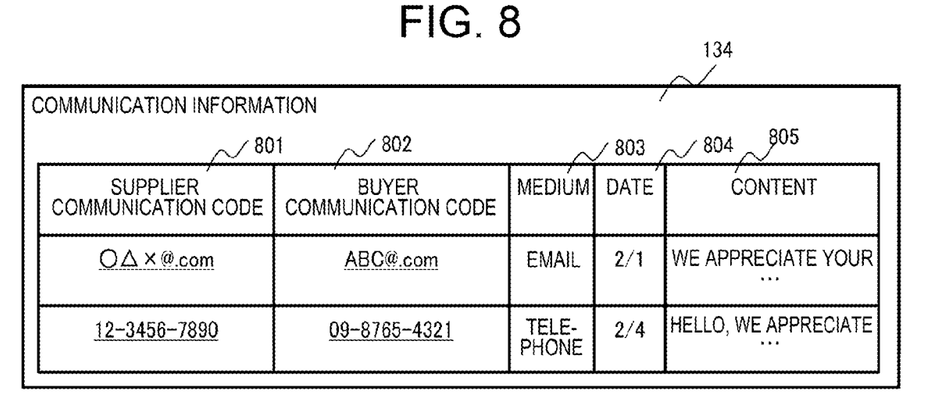
FIG. 8 is a diagram illustrating a data configuration example of communication information in which emails and voice call histories conducted between buyers and suppliers are stored according to an embodiment of the present invention.

FIG. 8 is a diagram illustrating a data configuration example of communication information 134 in which detailed information received from the buyer system 101 regarding emails and voice calls conducted between buyers and suppliers is stored. The communication information 134 includes a supplier communication code 801 for storing a phone number and an email address of a supplier, a buyer communication code 802 for storing a phone number and an email address of a buyer, a medium 803 for storing a communication medium, a date 804 for storing the occurrence date of the voice call or email, and content 805 for storing the contents of the voice call or email. The stored data of the supplier communication code 801 and the buyer communication code 802 differ depending on the communication medium, storing an email address when the medium 803 is email and a phone number when the medium 803 is telephone. Since each item is the same as each item of the supplier evaluation information 139 described above, the description thereof is omitted here.

Figure 9:
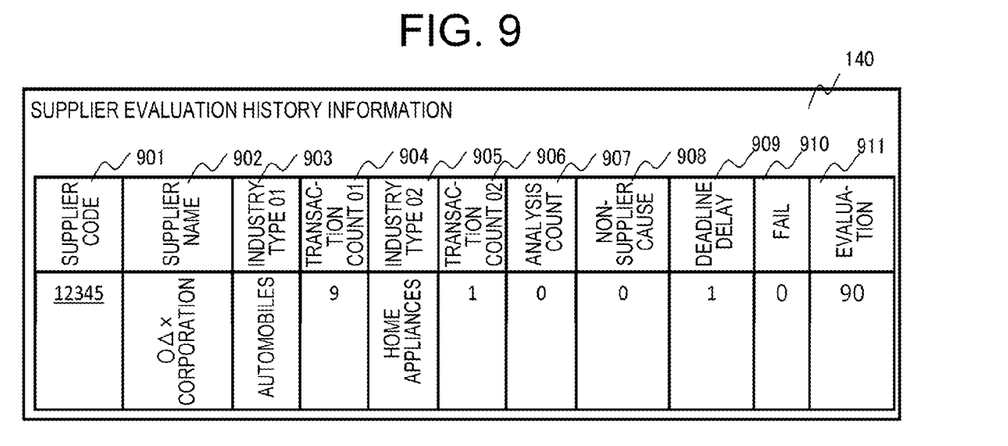
FIG. 9 is a diagram illustrating a data configuration example of supplier evaluation history information in which the history of the supplier evaluation information is stored according to an embodiment of the present invention.

FIG. 9 is a diagram illustrating a data configuration example of the supplier evaluation history information 140 in which the history of the supplier evaluation information 139 is stored. The supplier evaluation history information 140 is stored per supplier, and stores the previous supplier evaluation information 139 each time the supplier evaluation information 139 is updated.

Figure 10:
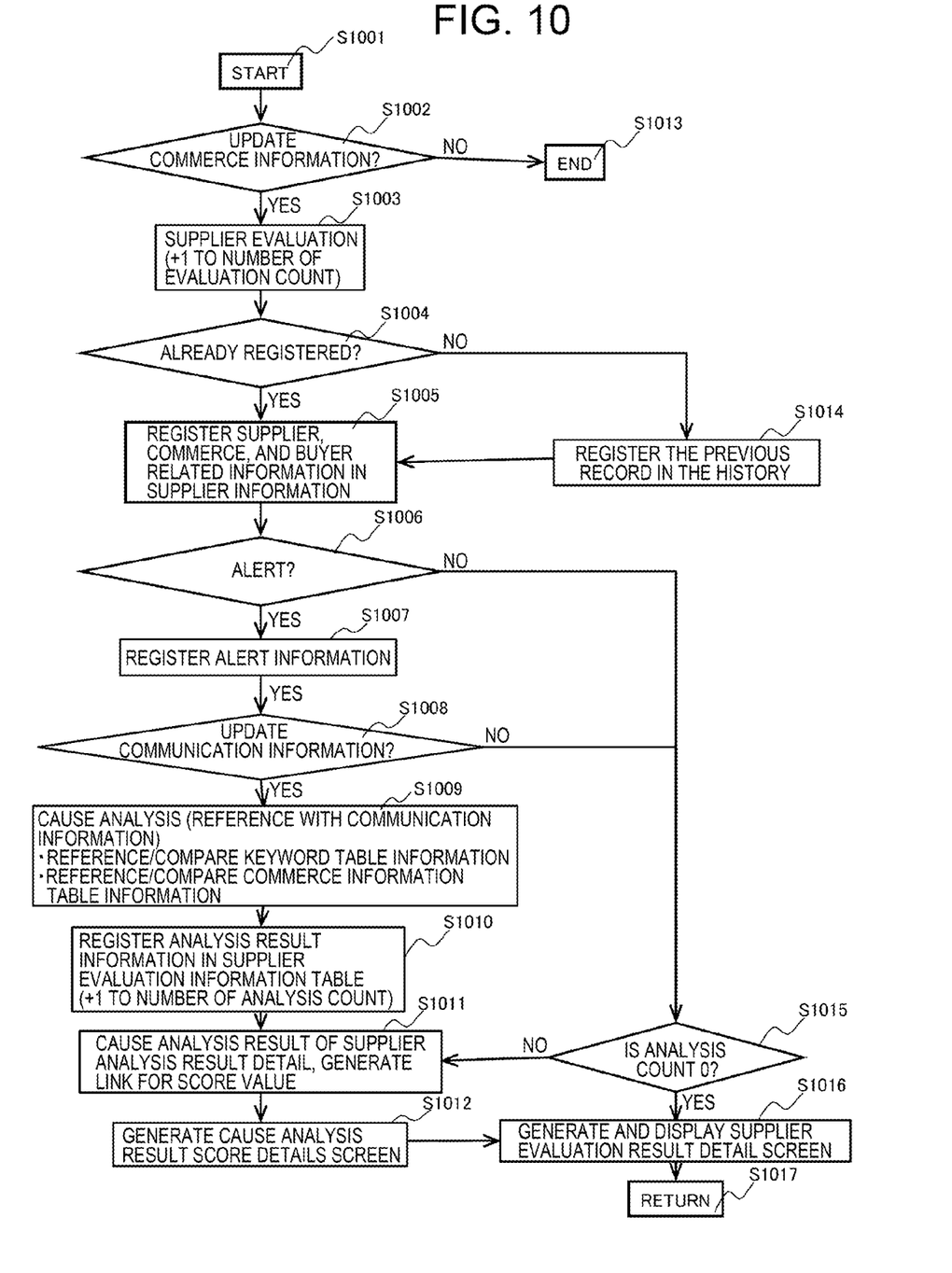
FIG. 10 is a flowchart illustrating a process in which the analysis server according to an embodiment of the present invention receives an update of commerce information as source information of the analysis, compares keyword information, the communication information, and the data, stores the results in the supplier evaluation information, and displays it on a screen.

FIG. 10 is a flowchart illustrating a process in which, when the analysis server 213 receives an update to the commerce information 135 that serves as source information for the analysis, the analysis server compares the data of the keyword information 138 and the communication information 134, stores the results in the supplier evaluation information 139, and displays the results on a screen.

The analysis server 213 checks whether the supplier evaluation system 117 has updated the commerce information 135 (S1002). Upon confirming the update, the analysis server 213 extracts the supplier code 504 of the updated commerce information 135. Subsequently, the quality level is quantitatively supplier evaluated based on the commerce information 135 and the supplier information 137 for each supplier code 504 (S1003). The supplier evaluation system 117 terminates the process at END (S1013) in the case that the commerce information 135 is not updated. It should be noted that, as for the quantitative evaluation method and process, the evaluation procedure and method are not limited as long as they have functionality for implementing supplier evaluation that does not depend only on buyer input as in the evaluation methods illustrated in Patent Document 1 and Patent Document 2, as examples.

After the supplier evaluation (S1003), as a preliminary preparation for executing the cause analysis of the supplier evaluation, the analysis function 216 of the analysis server 213 acquires the basic information and confirms whether the necessary information is available (S1003). First, the analysis function 216 refers to the analysis count 607 included in the supplier evaluation information 139 to check whether the cause analysis has been performed in the past (S1004). In the case that the analysis count 607 is one or greater, the analysis function 216 stores the information of the supplier evaluation information 139 in the supplier evaluation history information 140 (S1014). If not yet registered, that is, in the case that the analysis count 607 is equal to or less than 0, the analysis function 216 skips the process of storing the information of the supplier evaluation information 139 in the supplier evaluation history information 140 and performs step (S1005) described below.

Next, the analytical function 216 then acquires necessary data from other information by using the supplier code 601 of the supplier evaluation information 139 as a key (S1005). First, the analysis function 216 acquires the supplier name 602 from the supplier information 137. Next, the analysis function 216 refers to the commerce information 135 and the buyer information 136, and obtains the industry type 01 603, the transaction count 01 604 associated therewith, and the industry type 02 605 and the transaction count 02 606 associated therewith. The industry type 01 603 and the transaction count 01 604 associated therewith, and the industry type 02 605 and the transaction count 02 606 associated therewith are created by a procedure of retrieving the commerce information 135 using the supplier code 601 as a key, retrieving the buyer information 136 using the corresponding plurality of buyer codes 502 as keys, storing the industry type associated with the retrieved buyer code 401 in the industry type 01 603 of the supplier evaluation information 139, and storing it in the industry type 02 605 when a plurality of industry types are retrieved. In addition, when the industry type 403 corresponding to the buyer code 401 included in the buyer information 136 is retrieved from the buyer code 502 included in the commerce information 135, in the case that the same industry type is searched a plurality of times, the number of times each industry type is retrieved is counted up and stored in the transaction count 01 604 included in the supplier evaluation information 139. In the case that a plurality of industry types are retrieved, they are stored in and after the transaction count 02 606.

After S1005 is completed, the analyzing function 216 searches the commerce information 135 using the supplier code 601 as a key, and checks the presence or absence of data of the alert 511 included in the commerce information 135 is stored (S1006). If the alert 511 is present, the analysis function 216 obtains information related to the alert, such as deadline delay 609 and fail 610 information, for each supplier code 601 based on the alert 511. The deadline delay 609 stores a numerical value obtained by retrieving the commerce information 135 using the supplier code 601 as a key, and counting the records in which the alert 511 included in the commerce information 135 is a deadline delay (S1007).

In addition, the fail 610 stores a numerical value obtained by searching the commerce information 135 using the supplier code 601 as a key, and counting the records in which the test 510 included in the commerce information 135 fails. Next, the analysis function 216 refers to the supplier information 137 using the supplier code 601 as a key, acquires the phone number 303 and the email address 304, and checks whether the communication information 134 corresponding to the supplier communication code 801 included in the communication information 134 exists (S1008).

If the communication information 134 corresponding to the supplier communication code 801 exists, the analysis function 216 begins the following cause analysis (S1009). To begin with, the analysis function 216 checks whether the plurality of pieces of communication information 134 retrieved with the corresponding supplier code 601 are the pieces of communication information 134 for which the cause analysis is to be performed. First, the analysis function 216 extracts, from among the corresponding supplier codes 601, a record of the commerce information 135 in which an alert 511 has occurred. The analysis function 216 refers to the buyer code 502 of the extracted record, refers to the phone number 404 and the email address 405 included in the buyer information 136, and compares with the buyer communication code 802 included in the communication information 134. As a result of the comparison, the analysis function 216 extracts a record of the buyer communication code 802 that matches the phone number 404 or the email address 405 from the plurality of communication information 134 retrieved with the corresponding supplier code 601.

Next, the analysis function 216 then compares the alert 511 of the commerce information 135 including the corresponding supplier code 601 with the alert 701 of the keyword information 138, and analyzes whether the key 1702— of the records in which the same alert is stored are included in the content 805 of the communication information 134 extracted above. Further, the analysis function 216 analyzes whether all the data items of the records of the corresponding commerce information 135 are included in the content 805 of the communication information 134, and extracts a communication information 134 that includes a large number of words that match the key 1702- to the content 805 and the corresponding data items of the commerce information 135.

The analysis function 216 determines whether the sender of the content included in the extracted communication information 134 is a buyer or a supplier. In the case that the sender is a supplier and the content 805 includes an apology or a request regarding the content of the alert 511, the analysis function 216 does not update the non-supplier cause 608 included in the supplier evaluation information 139. Conversely, in the case that the sender is a buyer and the content 805 includes an apology or a request regarding the content of the alert 511, the analysis function 216 increments by one the value of the non-supplier 608 included in the supplier evaluation information 139. As a result, it is possible to accumulate data that clarifies whether the cause of the problem was on the buyer side or on the supplier side. It should be noted that, although not illustrated in the figures, a keyword for retrieving content 805 including an apology or a request is stored as keyword information for analysis in a table different from the keyword information 138, and is referred to at the time of analysis.

Figure 13:
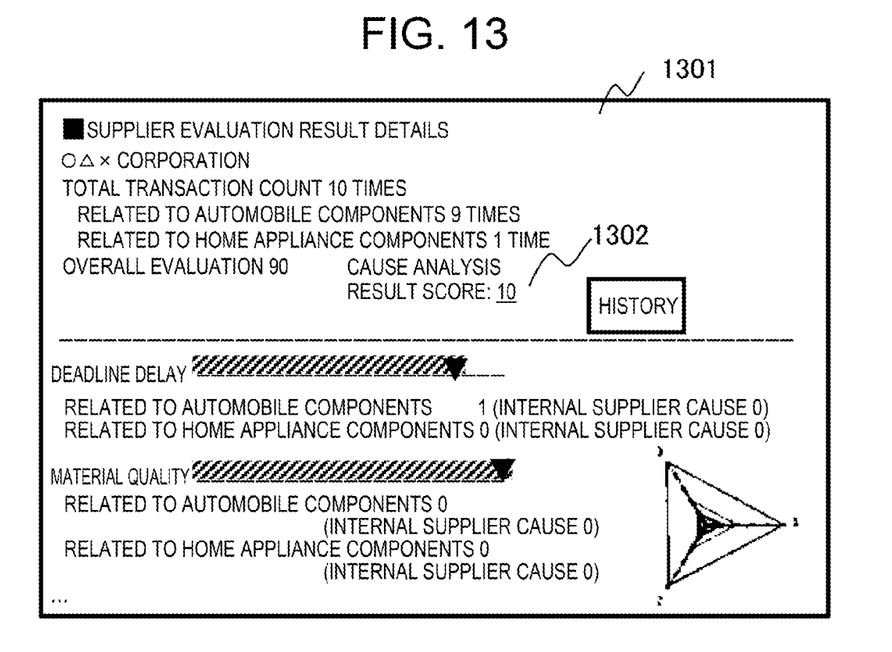
FIG. 13 is an example of a display screen of the supplier evaluation result displayed on the user terminal according to an embodiment of the present invention.

When the cause analysis of S1009 is completed, the analysis function 216 increments the numerical value of the analysis count 607 included in the supplier evaluation information 139 by 1, and calculates the numerical value of the cause analysis result score 1302 included in the supplier evaluation result details 1301 illustrated in FIG. 13 in S1010. The cause analysis result score 1302 is created in the supplier evaluation result details 1301 in the form of a link that transitions to the cause analysis result score details screen 1501 illustrated in FIG. 15, and is obtained by dividing the numerical value subtracted by the supplier evaluation (S1003) included in the supplier evaluation information 139 by the numerical value of the non-supplier cause 608 (S1011).

Figure 15:
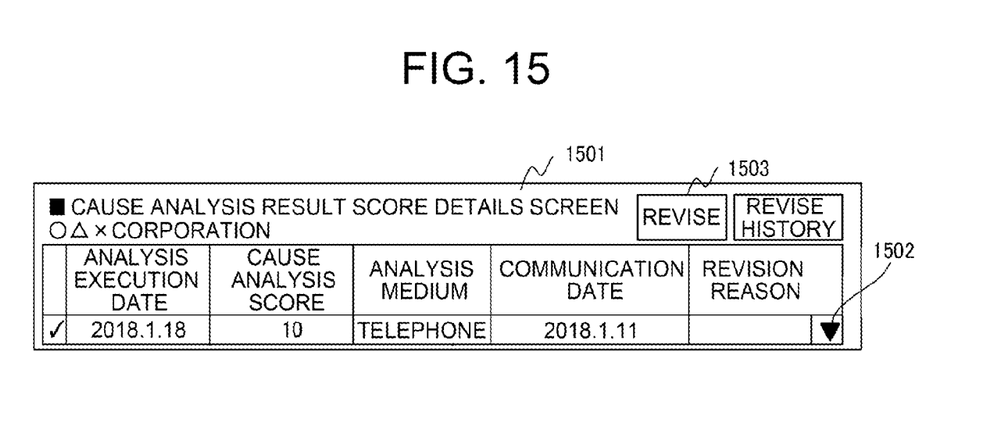
FIG. 15 is an example of a cause analysis result score details screen that is transitioned to from a link of the cause analysis result score value displayed in the supplier evaluation result details according to an embodiment of the present invention.

In S1012, the external output function 230 of the online server 227 (output device) creates the screen of the cause analysis result score details 1501 that transitions from the link of the cause analysis result score 1302. The online server 227 outputs an analysis execution date, a cause analysis score, an analysis medium, a communication date, and the like on the screen of the cause analysis result score details 1501. After the external output function 230 of the online server 227 creates the link of the cause analysis result score 1302 of the supplier evaluation result details 1301 and the screen of the cause analysis result score details 1501, and creates the supplier evaluation result details 1301 in S1016 and displays it on the screen, the supplier evaluation system 117 returns from S1017 to S1001.

It should be noted that when S1006 is No (when no alert exists), or S1008 is No (when no communication information is updated), and when the analysis count included in the supplier evaluation information 139 in S1015 is 0, the external output function 230 does not create the link of the cause analysis result score 1302 of the supplier evaluation result details 1301 or the screen of the cause analysis result score details 1501. After the external output function 230 directly executes S1016, creates the supplier evaluation result details 1301, and displays it on the screen, the supplier evaluation system 117 returns from S1017 to S1001.

Figure 11:
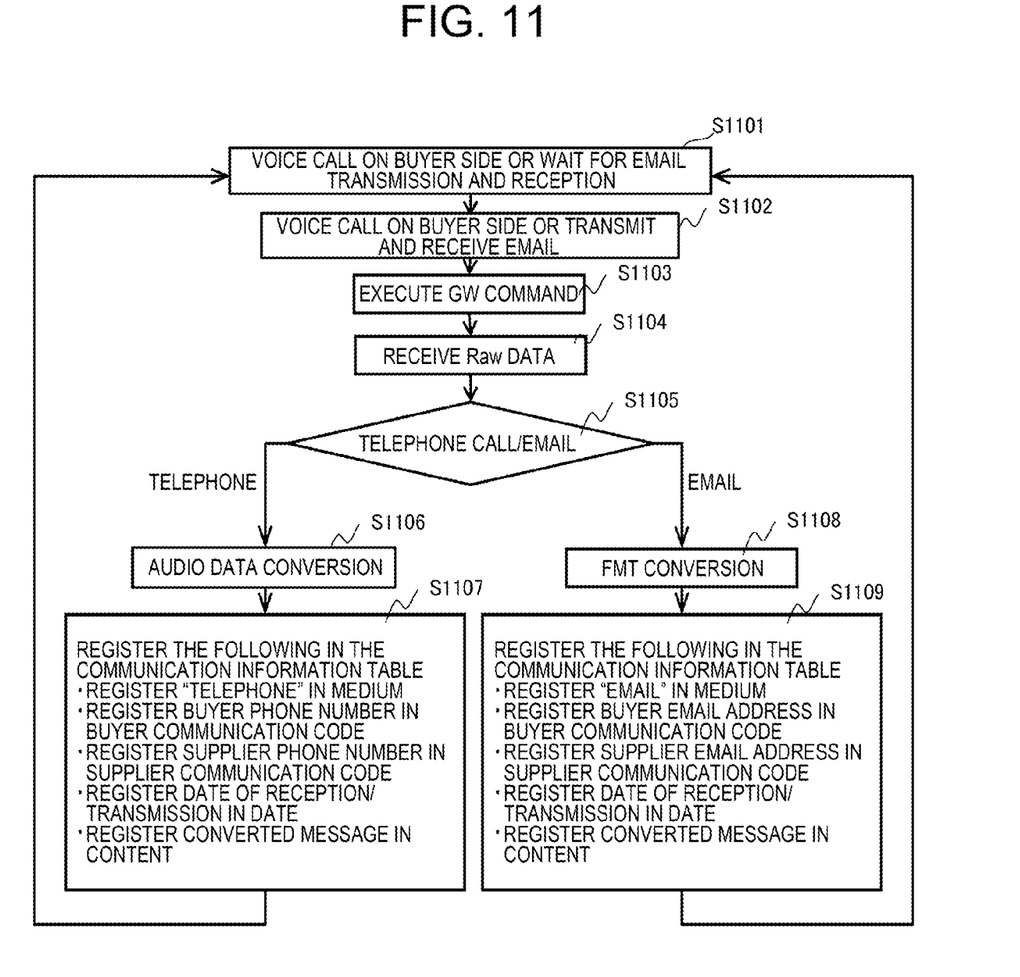
FIG. 11 is a flowchart illustrating a process of receiving a voice call history or email information from a buyer system, data conversion, and storing as communication information according to an embodiment of the present invention.

FIG. 11 is a flowchart illustrating a process of receiving a voice call history or email information from the buyer system 101, data conversion, and storing as communication information 134. The buyer system 101 waits for new data to be transmitted or received on the telephone system 102 or the email system 106 included in the buyer system 101 in S1101. Next, the buyer system 101 executes the JOB of each system upon detecting the new data transmission or reception in S1102, executes the command 15 in S1103, and transmits the raw data of the voice call history or the email information to the supplier evaluation system 117. In S1104, the supplier evaluation system 117 receives the raw data, and determines whether the received data is a voice call history or email information in S1105.

When the received data is a voice call history, the data conversion function 212 of the conversion server 209 converts the voice data into text data (textual information) at S1106 for each voice call, and registers the supplier communication code 801, the buyer communication code 802, the medium 803, the date 804, and the content 805 in the communication information 134 in a predetermined format as described below. The data conversion function 212 stores a phone number in the supplier communication code 801 and the buyer communication code 802. The data conversion function 212 registers "telephone" in the medium 803 and stores the received/transmitted date and time in the date 804, and the contents of the converted text data in the content 805.

When the received data is an email, the data conversion function 212 converts the format of the email data into a predetermined format at S1108 for each thread as described below. The data conversion function 212 registers the supplier communication code 801, the buyer communication code 802, the medium 803, the date 804, and the content 805 in the communication information 134 at S1109. The data conversion function 212 stores the email address in the supplier communication code 801 and the buyer communication code 802. The data conversion function 212 registers "email" in the medium 803, stores the received/transmitted date and time in the date 804, and stores the converted content in the content 805. When emails with different dates in the same thread are received at different times, the data is stored by overwriting together with the past thread. It should be noted that, although not illustrated in the figures, the specific products, procedures, and functions for converting the audio data into text are not limited herein.

Figure 12:
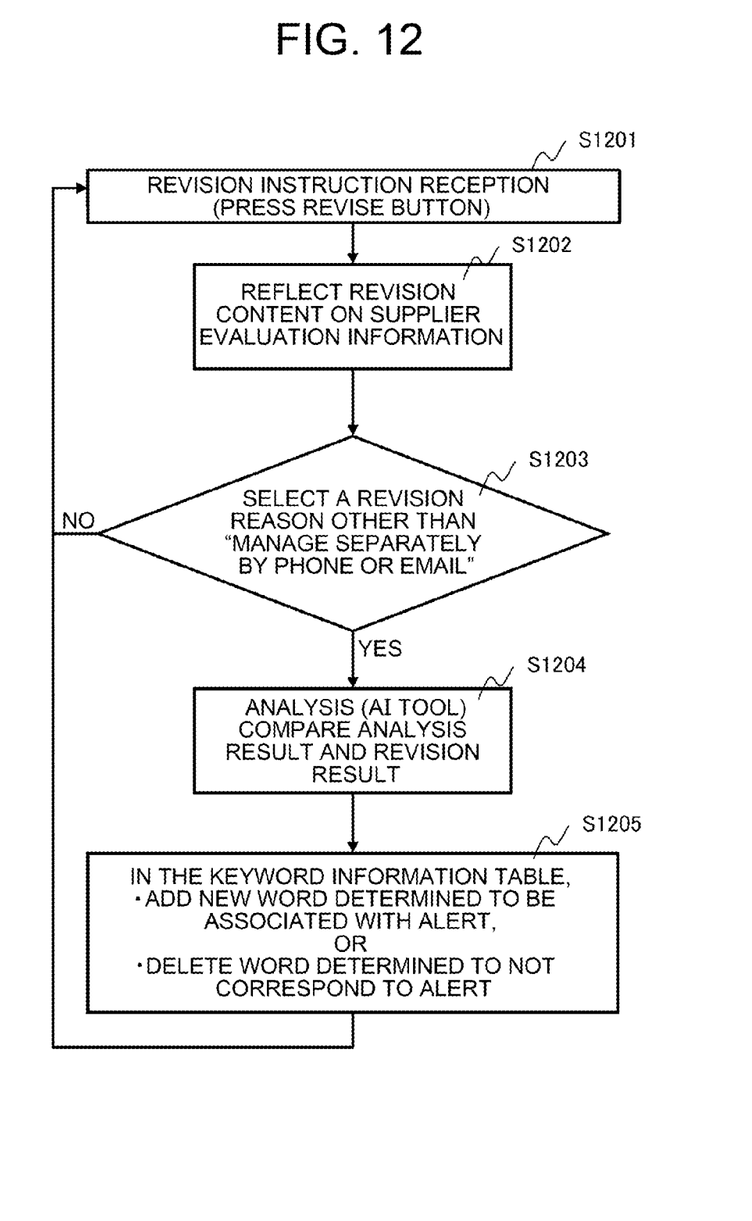
FIG. 12 is a flowchart illustrating a process in which a supplier evaluation cause analysis result revision instruction is received from a user terminal, the revision contents are registered, the data registered in the keyword information is analyzed as to whether it is suitable, and the information registered in the keyword information is revised according to an embodiment of the present invention.

FIG. 12 is a flowchart illustrating a process in which supplier evaluation-cause analysis result revision instruction is received from a user terminal 142 (S1201), the revision contents are registered (S1202), the data registered in the keyword information 138 is analyzed as to whether it is suitable (S1204), and the information registered in the keyword information 138 is revised (S1205).

The user of the supplier evaluation system 117 accesses the cause analysis result score details 1501 from the user terminal 142, selects the revision reason 1502, and presses the revision button 1503 of the cause analysis result score details 1501. The supplier evaluation system 117 then initiates the revision process starting from S1201. First, the online server 227 accesses the supplier evaluation information 139 on the database server 217 to reflect the revision content (S1202).

Next, the online server 227 confirms the revision reason 1502 (S1203), and in the case that the revision reason 1502 is "managed separately by phone or email," the process ends and returns to the state of waiting for reception of a revision instruction. If the revision reason 1502 is not "managed separately by phone or email," by introducing a machine learning function in S1204, the supplier evaluation system 117 periodically checks the consistency of the keys 1702— included in the keyword information 138 based on the revision result by machine learning the revision data. The results analyzed by S1204 are represented in the keyword information 138 at S1205, and the addition of a new word that is determined to be associated with the alert, or the deletion of a word that is determined to not correspond to the alert is performed. The machine learning function may be any product, procedure, or method as long as it has a function for accumulating data, learning, and reflecting the results. In this manner, the supplier evaluation system 117 receives a revision instruction from the user for the once-determined result, reflects the revision instruction on the determined result, and updates the keyword information 138 based on the reflected determined result. This makes it possible to provide a highly reliable supplier evaluation system 117 that correctly evaluates the supplier by further revising the result of the determination.

FIG. 13 is an example of a display screen of a supplier evaluation result displayed on the user terminal 142. The supplier evaluation result details 1301 are created based on the data included in the supplier evaluation information 139. The supplier evaluation result detail 1301 includes supplier basic information, supplier evaluation results, supplier evaluation analysis results, and the like. The total transaction count indicates a numerical value obtained by totaling the number of transactions for each industry type stored in the supplier evaluation information 139. As described with reference to FIG. 10, the cause analysis result score 1302 is a numerical value obtained by dividing the numerical value subtracted by the supplier evaluation (S1003) included in the supplier evaluation information 139 by the numerical value of the non-supplier cause 608. The supplier assessment result details 1301 is created in the form of a link that transitions the cause analysis result score 1302 to the cause analysis result score details 1501 (S1011). The supplier evaluation result details include a radar chart, a graph, and the like. In this manner, the supplier evaluation system 117 visually represents and outputs the supplier evaluation results, thereby making it possible to provide the supplier evaluation in an easy-to-understand manner.

Figure 14:
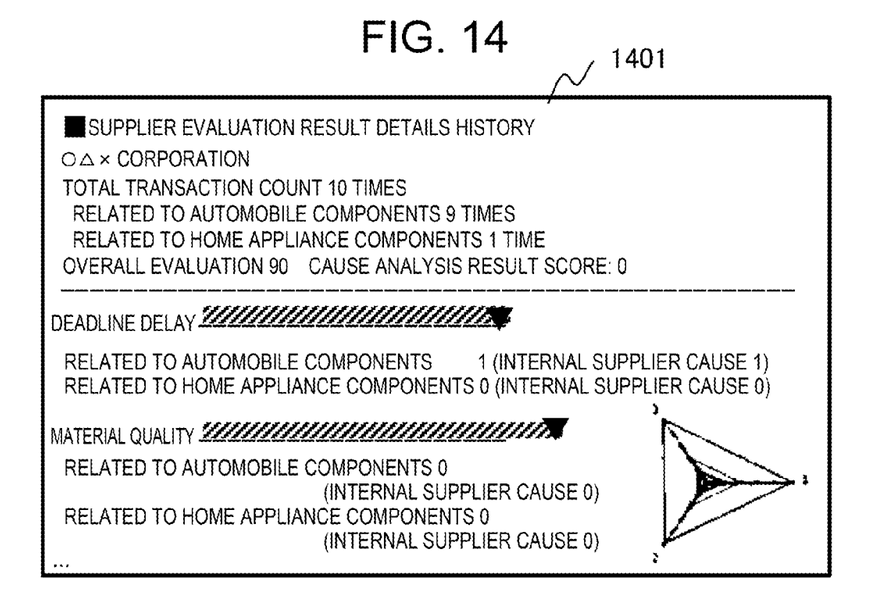
FIG. 14 is an example of a history details screen of the supplier evaluation result details displayed on the user terminal according to an embodiment of the present invention.

FIG. 14 is an example of a history details screen of the supplier evaluation result details 1301 displayed on the user terminal 142. When the user presses the history button in the supplier evaluation result details 1301, it transitions to the supplier evaluation result history 1601 illustrated in FIG. 16, and when the link of the update date is clicked, it transitions to the supplier evaluation result detail history 1401 updated on the clicked update date.

FIG. 15 is an example of the cause analysis result score details 1501 screen which is transitioned to from the link of the cause analysis result score value displayed in the supplier evaluation result details 1301. As described in FIG. 10, the screen of the cause analysis result score details 1501 includes an analysis execution date, a cause analysis score, an analysis medium, and a communication date, and as described in FIG. 12, when the user of the supplier evaluation system 117 accesses the cause analysis result score details 1501 from the user terminal 142, selects the revision reason 1502, and presses the revision button of the cause analysis result score details 1501, the revision process is initiated. When the revision history button is pressed, the screen transitions to the revision history screen.

Figure 16:
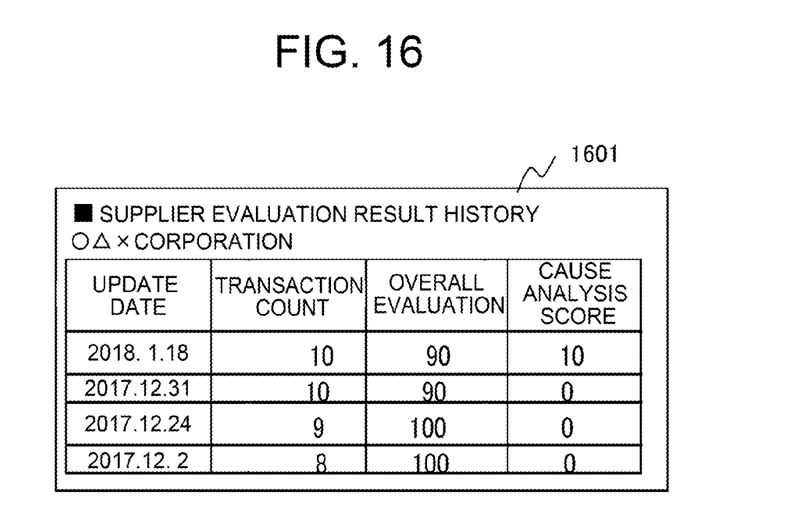
FIG. 16 is an example of a history list screen of a display screen for a supplier evaluation result displayed on a user terminal according to an embodiment of the present invention.

FIG. 16 is an example of a history list screen of the supplier evaluation result details 1301 of the supplier evaluation results displayed on the user terminal 142. The supplier evaluation result history 1601 includes information such as update date, the transaction count, the overall evaluation, and the cause analysis score for each update date, and transitions to the supplier evaluation results history 1601 when the history button is pressed in the supplier evaluation result details 1301, and transitions to the supplier evaluation result details history 1401 updated on the update date when the link of the update date is clicked, as described in FIG. 14.

The supplier evaluation system 117 described above is a system for evaluating a supplier based on information about transactions performed between a buyer and the supplier. The supplier evaluation system 117 includes a reception server 201 (reception device) configured to receive communication information 134 and e-commerce information 135 carried out between a buyer and a supplier and that exists in a system used by one or both of the buyer and the supplier, a conversion server 209 (conversion device) configured to convert the communication information 134 and the e-commerce information 135 into a predetermined format, a database server 217 (storage device) configured to store the keyword information 138, and an analysis server 213 (analysis device) configured to compare the keyword information 138 registered in advance in the database server 217 with the converted communication information 134 and the e-commerce information 135 and determine a cause of the commerce information 135. The supplier evaluation system 117 may further include an online server 227 (output device) configured to electronically or visually output a result determined by the analysis server 213 (analysis device).

In addition, what has been described above is a method of evaluating a supplier based on information about transactions performed between a buyer and a supplier. The supplier evaluation method receives communication information 134 and e-commerce information 135 carried out between a buyer a supplier and that exists in a system used by one or both of the buyer and the supplier, converts the communication information 134 and the e-commerce information 135 into a predetermined format, compares the keyword information 138 registered in advance with the converted communication information 134 and the e-commerce information 135, and determines a cause of the transaction result of the commerce information 135.

By providing the above-described configuration, the evaluation time resulting from buyer input is reduced, and the number of work hours required for evaluation by the buyer is reduced. In addition, an objective evaluation is implemented using a unified evaluation axis, and background is analyzed from unstructured data such as email and call record, thereby realizing a reliable analysis result. As a result, it is possible to share optimized supplier information across departments within a company, and to find new but safe suppliers for those departments, resulting in cost reduction. The entry of new suppliers is encouraged, and the competitiveness required for quality improvement and price reduction in procurement operations can be improved.

It should be noted that the present invention is not limited to the illustrated embodiments, but can be implemented by a configuration within a scope not deviating from the content described in each claim. That is, although the present invention has been particularly illustrated and described primarily with respect to specific embodiments, various modifications may be made by those skilled in the art in regard to quantity and other detailed configurations of the embodiments described above without departing from the spirit and scope of the invention.

REFERENCE SIGNS LIST

101: Buyer system, 116: Network such as the Internet, 117: supplier evaluation system, 141: Network such as the Internet, 142: User terminal of the buyer or supplier, 201: Reception server, 209: Conversion server, 213: Analysis server, 217: Database server, 227: Online server

The invention claimed is:

1. A supplier evaluation method for evaluating a supplier based on information about transactions between a buyer and a supplier, the method comprising:
receiving communication information and e-commerce information associated with a transaction carried out between a buyer and a supplier and that exists in a system used by one or both of the buyer and the supplier;
converting the communication information and the e-commerce information into a predetermined format;
comparing keyword information registered in advance with the converted communication information and e-commerce information; and
determining a cause of a result of the e-commerce transaction.

2. The supplier evaluation method of claim 1, wherein:
the communication information includes voice information and textual information;
the textual information is converted into the predetermined format;
the voice information is converted into textual information in addition to being converted into the predetermined format.

3. The supplier evaluation method of claim 1, further comprising:
receiving a revision instruction with respect to a determined result;
reflecting the revision instruction on the determined result; and
updating the keyword information based on the reflected determined result.

4. The supplier evaluation method of claim 1, further comprising:
quantitatively evaluating a supplier based on transaction results of a plurality of the e-commerce information.

5. The supplier evaluation method of claim 4, further comprising:
graphing and displaying possessed basic information of the supplier, results of the quantitative evaluation, and the determined result.

6. The supplier evaluation method according to claim 1, further comprising:
electronically or visually outputting a determined result.

7. A supplier evaluation system for evaluating a supplier based on information about transactions between a buyer and a supplier, the system comprising:
a reception device configured to receive communication information and e-commerce information carried out between a buyer and a supplier and that exists in a system used by one or both of the buyer and the supplier;
a conversion device configured to convert the communication information and the e-commerce information into a predetermined format;
a storage device configured to store keyword information; and
an analysis device configured to compare keyword information registered in advance in the storage device with the converted communication information and e-commerce information, and determine a cause of a result of the e-commerce transaction.

8. The supplier evaluation system of claim 7, further comprising:
an output device configured to electronically or visually output a result determined by the analysis device.

* * * * *